United States Patent
Handa

(10) Patent No.: US 8,386,143 B2
(45) Date of Patent: Feb. 26, 2013

(54) CONTROL DEVICE FOR CONTROLLING DRIVE FORCE THAT OPERATES ON VEHICLE

(75) Inventor: Toshiyuki Handa, East Liberty, OH (US)

(73) Assignee: Nissin Kogyo Co., Ltd., Ueda-Shi (JP)

( * ) Notice: Subject to any disclaimer, the term of this patent is extended or adjusted under 35 U.S.C. 154(b) by 0 days.

(21) Appl. No.: 13/075,945

(22) Filed: Mar. 30, 2011

(65) Prior Publication Data

US 2012/0253623 A1    Oct. 4, 2012

(51) Int. Cl.
  *G06F 7/00* (2006.01)
  *G06F 19/00* (2011.01)
  *G06F 17/00* (2006.01)

(52) U.S. Cl. .................................................. 701/69

(58) Field of Classification Search .............. 701/69, 701/79; 180/233, 244, 248, 197
See application file for complete search history.

(56) References Cited

U.S. PATENT DOCUMENTS

| | | | | |
|---|---|---|---|---|
| 5,042,436 A | * | 8/1991 | Yamamoto et al. | 123/90.15 |
| 5,168,955 A | * | 12/1992 | Naito | 180/197 |
| 5,323,870 A | * | 6/1994 | Parigger et al. | 180/197 |
| 5,403,247 A | * | 4/1995 | Yagi | 477/107 |
| 5,803,197 A | * | 9/1998 | Hara et al. | 180/248 |
| 5,947,221 A | * | 9/1999 | Taniguchi et al. | 180/197 |
| 6,002,979 A | * | 12/1999 | Ishizu | 701/86 |
| 6,497,298 B2 | * | 12/2002 | Irie et al. | 180/197 |
| 6,729,426 B2 | * | 5/2004 | Suzuki | 180/197 |
| 7,784,577 B2 | * | 8/2010 | Yoneda | 180/197 |
| 2006/0212173 A1 | | 9/2006 | Post, II | |

* cited by examiner

*Primary Examiner* — Khoi Tran
*Assistant Examiner* — Nicholas Kiswanto
(74) *Attorney, Agent, or Firm* — Rankin, Hill & Clark LLP

(57) ABSTRACT

A control device for controlling a front wheel drive force and a rear wheel drive force of a vehicle comprises a first controller for controlling a drive force of a main drive wheel and a drive force of an auxiliary drive wheel, the drive force of the main drive wheel being one of the front-wheel drive force and the rear-wheel drive force, and the drive force of the auxiliary drive wheel being another of the front-wheel drive force and the rear-wheel drive force; a second controller for sending to the first controller an auxiliary-drive-wheels-limiting drive force for limiting the drive force of the auxiliary drive wheels in a case that the vehicle is traveling in an unstable state; and a third controller for controlling a motor drive force, which is a source of the drive force of the main drive wheel and the drive force of the auxiliary drive wheel. The third controller reduces the motor drive force on the basis of the auxiliary-drive-wheel-limiting drive force.

9 Claims, 5 Drawing Sheets

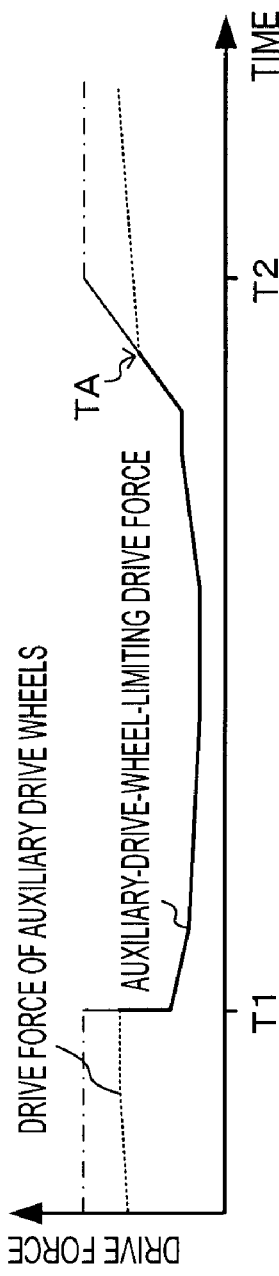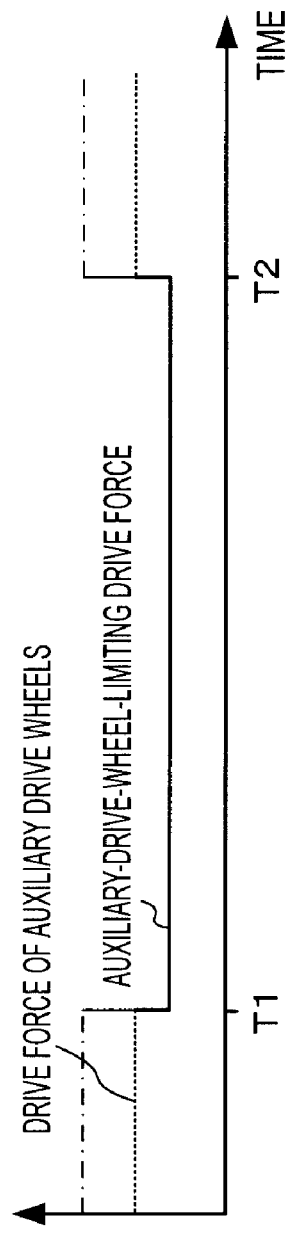
FIG.3 (A)
FIG.3 (B)

CONTROL DEVICE FOR CONTROLLING DRIVE FORCE THAT OPERATES ON VEHICLE

FIELD OF THE INVENTION

The present invention relates to a control device (drive force control device) for controlling front wheel drive force and rear wheel drive force of a vehicle.

BACKGROUND OF THE INVENTION

Vehicles, e.g., automobiles, generally have four wheels; i.e., two front wheels and two rear wheels, and can have an electronic control device for driving the wheels.

Japanese Laid-Open Patent Application (JP-A) No. 2006-256605 discloses a four-wheel-drive electronic control unit (4WD-ECU) as such an electronic control device. The 4WD-ECU disclosed in JP 2006-256605 A together with a vehicle stability assist (VSA)-ECU controls the drive force that acts on the vehicle; and, specifically, sets the four-wheel-drive force in terms of units of, e.g., torque.

A 4WD-ECU thus operates in coordination with the VSA-ECU and controls the drive force. Specifically, the VSA-ECU can request the 4WD-ECU to limit the drive force in the case that, e.g., the vehicle is traveling in an unstable state. The 4WD-ECU can reduce the drive force and improve vehicle stability in response to a request from the VSA-ECU.

A VSA-ECU or other vehicle behavior control means can generally be provided with at least one function from among a function for suppressing spinning of the wheels (traction control system), a function for suppressing locking of the wheels (antilock brake system), and a function for suppressing lateral sliding of a vehicle.

The vehicle is provided with motor control means (e.g., engine-ECU) as an electronic control device for controlling the motor drive force, which is a drive force source, and the engine-ECU, 4WD-ECU, and VSA-ECU control the drive force overall.

SUMMARY OF THE INVENTION

An object of the present invention is to provide a control device that can improve the stability of a vehicle.

Other objects of the present invention will be apparent to those skilled in the art in the description of a plurality of modes and preferred embodiments below with reference to that attached diagrams.

A number of aspects from among the plurality of aspects pursuant to the present invention will be described below in order to facilitate understanding of the general overview of the present invention.

According to the present invention, there is provided a control device for controlling a front-wheel drive force and a rear-wheel drive force of a vehicle, the control device comprising: first control means for controlling a drive force of a main drive wheel and a drive force of an auxiliary drive wheel, the drive force of the main drive wheel being one of the front-wheel drive force and the rear-wheel drive force, and the drive force of the auxiliary drive wheel being another of the front-wheel drive force and the rear-wheel drive force; second control means for sending to the first control means an auxiliary-drive-wheel-limiting drive force for limiting the drive force of the auxiliary drive wheel in the case that the vehicle is traveling in an unstable state, and third control means for controlling a motor drive force, which is a source of the drive force of the main drive wheel and the drive force of the auxiliary drive wheel, wherein the third control means reduces the motor drive force on the basis of the auxiliary-drive-wheel-limiting drive force.

The second control means sends to the first control means an auxiliary-drive-wheel-limiting drive force for limiting the auxiliary drive wheel drive force in the case that the vehicle is traveling in a state of, e.g., oversteer and is therefore unstable. The first control means may reduce the auxiliary drive wheel drive force in the case that the first control means receives a request or instruction from the second control means. Oversteer or other instability can thereby be suppressed or eliminated. At this time, the main drive wheels can slip due to an increase in the main drive wheel drive force accompanied by a reduction in the auxiliary drive wheel drive force. Nevertheless, the third control means reduces the motor drive force on the basis of the auxiliary-drive-wheel-limiting drive force, whereby the amount of increase in the main drive wheel drive force is reduced. Slipping of the main drive wheel can thereby be suppressed. Therefore, an improvement is realized in regard to, e.g., the stability of the vehicle.

Preferably, the first control means increases the drive force of the main drive wheel by causing the drive force of the auxiliary drive wheel to match the auxiliary-drive-wheel-limiting drive force.

The auxiliary drive wheel drive force is reliably reduced to the auxiliary-drive-wheel-limiting drive force, whereby oversteer or other instability can be suitably suppressed or eliminated.

According to the invention, the second control unit may further have a detection unit for detecting whether the traveling state is unstable.

When the traveling state has been detected to be unstable by the detection unit, the second control means sends an auxiliary-drive-wheel-limiting drive force to the first control means, and the third control means can reduce the motor drive force. In other words, when the second control means initiates a request to the first control means, the third control means can initiate a reduction of the motor drive force, which is based on the auxiliary-drive-wheel-limiting drive force.

Preferably, the second control means has a first calculation unit for calculating the auxiliary-drive-wheel-limiting drive force; and a second calculation unit for calculating a reduced drive force that represents an amount of reduction of the motor drive force on the basis of the auxiliary-drive-wheel-limiting drive force.

The second control means calculates the auxiliary-drive-wheel-limiting drive force and can calculate a reduced drive force.

According to the invention, the reduced drive force may decrease in correspondence with an increase in at least one of longitudinal acceleration and lateral acceleration of the vehicle.

The reduced drive force (the amount by which the motor drive force is reduced) can be set at a low level in the case that the longitudinal acceleration of the vehicle is high. The reduced drive force can be set at a low level in the additional case that the lateral acceleration of the vehicle is high. Change in the motor drive force is reduced and vehicle stability is improved by setting the reduced drive force to a low level.

According to the invention, the second calculation unit may calculate as the reduced drive force a value obtained by multiplying a coefficient and a difference between the drive force of the auxiliary drive wheel and the auxiliary-drive-wheel-limiting drive force; and the coefficient may decrease in correspondence with an increase in at least one of longitudinal acceleration and lateral acceleration of the vehicle.

In the case that the longitudinal acceleration of the vehicle is high, the coefficient is set to be small, and the reduced drive force (the amount by which the motor drive force is reduced) can therefore be set at a low level. In the case that the lateral acceleration of the vehicle is high, the coefficient is set to be small, and the reduced drive force can therefore be set at a low level. Change in the motor drive force is reduced and vehicle stability is improved by setting the reduced drive force to a low level.

Preferably, the second control means sends the reduced drive force to the third control means; and the third control means may reduce the motor drive force by an amount equal to the reduced drive force.

The second control means sends auxiliary-drive-wheel-limiting drive force to the first control means, and the second control means can send reduced drive force to the third control means. The first control means reduces the auxiliary drive wheel drive force, and the third control means reduces the motor drive force. The control device can suppress or eliminate oversteer or other instability while suppressing slippage of a main drive wheel.

According to the invention, the drive force of the main drive wheel may be the front-wheel drive force, and the drive force of the auxiliary drive wheel may be the rear-wheel drive force.

In the case that the vehicle is traveling in a state of, e.g., oversteer and is therefore unstable, the rear-wheel drive force (auxiliary drive wheel drive force) is reduced, the front-wheel drive force (main drive wheel drive force) is increased, and oversteer can be reduced or eliminated.

According to the invention, the first control means is a drive force control means, the second control means is a vehicle behavior control means, and the third control means is motor control means.

Persons skilled in the art can readily understand that each of a plurality of embodiments in accordance with the present invention can be modified without departing from the spirit of the present invention.

BRIEF DESCRIPTION OF THE DRAWINGS

Certain preferred embodiments of the present invention will be described in detail below, by way of example only, with reference to the accompanying drawings, in which:

FIGS. 3(A) and 3(B) are graphical representations of examples of the outputs from a calculation unit of the control device;

DETAILED DESCRIPTION OF THE PREFERRED EMBODIMENTS

The embodiments described below are used for facilitating understanding of the present invention. Therefore, persons skilled in the art should note that that the present invention is not unduly limited by the embodiments described below.

1. Vehicle

Figure 1:
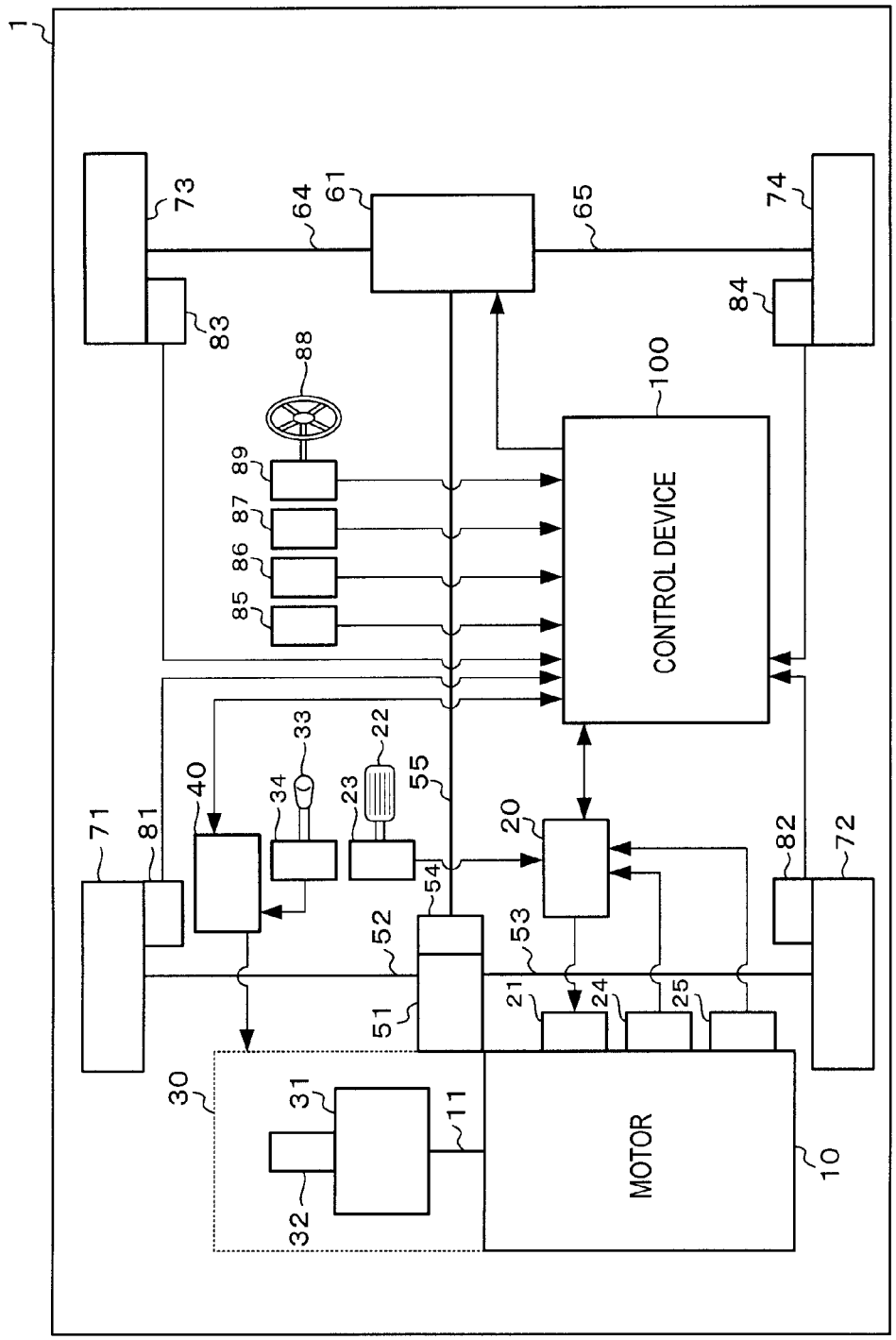
FIG. 1 is a diagrammatical view showing a general configuration of a vehicle provided with a control device according to the present invention.

FIG. 1 diagrammatically shows a general configuration of a vehicle provided with a control device according to the present invention. A vehicle 1 (e.g., an automobile) is provided with a control device 100 capable of executing various controls, as shown in FIG. 1. The control device 100 is capable of controlling the front wheel drive force (the target value of the drive force transmitted to front wheels 71, 72) and the rear wheel drive force (the target value of the drive force transmitted to rear wheels 73, 74) of the vehicle 1 as examples of the various controls. Specific control of the control device 100 according to the present invention is described below in "2. Control Device."

In the example of FIG. 1, the vehicle 1 is provided with a motor 10 (e.g., gasoline engine or another internal combustion engine), the motor 10 has an output shaft 11, and the motor 10 can cause the output shaft 11 to rotate. The vehicle 1 is provided with motor control means 20 (e.g., an engine ECU) for controlling the motor 10, and a throttle actuator 21. The motor control means 20 obtains the motor drive force (target value), and the motor control means 20 controls the throttle actuator 21 so that the rotation (the actual motor drive force) of the output shaft of the motor 10 matches the motor drive force (target value).

The throttle (not shown) position for controlling the amount of air-fuel mixture flowing into the motor 10 is controlled based on the motor drive force via the throttle actuator 21. In other words, the motor control means 20 obtains the throttle position that corresponds to the motor drive force, generates a control signal that corresponds to the throttle position, and sends the control signal to the throttle actuator 21. The throttle actuator 21 adjusts the throttle position in accordance with the control signal from the motor control means 20.

The vehicle 1 is provided with an accelerator pedal 22 and an accelerator sensor 23. The accelerator sensor 23 detects the amount of operation of the accelerator pedal 22 by the driver of the vehicle 1 and sends the amount of operation of the accelerator pedal 22 to the motor control means 20. The motor control means 20 generally obtains the throttle position or the motor drive force on the basis of the amount of operation of the accelerator pedal 22. The vehicle 1 is provided with an engine speed sensor 24 and a pressure sensor 25. In the case that the motor 10 is, e.g., an engine, the engine speed sensor 24 can detect the engine speed, and the pressure sensor 25 can detect the absolute pressure inside the intake tube that takes the air-fuel mixture into the engine. The motor control means 20 can obtain the throttle position or the motor drive force on the basis of the amount of operation of the accelerator pedal 22, and the detected absolute pressure and engine speed. The motor control means 20 can modify the amount of operation of the accelerator pedal 22 on the basis of a control signal (e.g., the traveling state of the vehicle 1) from the control device 100. Alternatively, the motor control means 20 may obtain the motor drive force and the throttle position on the basis of the amount of operation of the accelerator pedal 22, the detected engine speed, the detected absolute pressure, and a control signal from the control device 100.

In the example of FIG. 1, the vehicle 1 may be provided with a power transmission apparatus (power train, drive train). The power transmission apparatus has, e.g., a transmission 30, a front differential gear mechanism 51, front drive shafts 52, 53, a transfer 54, a propeller shaft 55, a rear differential gear mechanism 61, rear drive shafts 64, 65, as shown in FIG. 1. The transmission 30 has a torque converter 31 and gear mechanism 32.

The power transmission apparatus is not limited to the example of FIG. 1, and it is also possible to modify, revise, or implement the example of FIG. 1. The power transmission apparatus may be, e.g., the drive force transmission system 3 disclosed in FIG. 2 of Japanese Laid-open Patent Application (JP-A) No. 07-186758.

The rotation (the actual motor drive force) of the output shaft of the motor 10 is converted to actual all-wheel drive force (the actual front-wheel drive force and the rear-wheel drive force) via the power transmission apparatus. In the control related to such conversion, the all-wheel drive force is determined based on the motor drive force (target value) of the motor control means 20, the amplification factor (target value) of the torque converter 31, and the speed-change gear ratio (target value) of the gear mechanism 32. The distribution from the front-wheel drive force (target value), which is the main drive wheel drive force, to the rear-wheel drive force (target value), which is the auxiliary drive wheel drive force, is determined based on the front-wheel drive force (target value) and the distribution ratio of the rear differential gear mechanism 61.

In the case that the distribution ratio of the rear differential gear mechanism 61 is, e.g., 100:0 in terms of the front-wheel drive force to rear-wheel drive force, the front-wheel drive force (target value), which is the drive force of the main drive wheel, matches the all-wheel drive force (target value). In the case that the distribution ratio of the rear differential gear mechanism 61 is, e.g., (100-x):x in terms of the front-wheel drive force to rear-wheel drive force, the front-wheel drive force (target value), which is the main drive wheel drive force, matches the value obtained by subtracting the rear-wheel drive force (target value), which is the drive force of the auxiliary drive wheel, from the all-wheel drive force (target value).

The front wheels 71, 72 are controlled by the front-wheel drive force (target value) via the front differential gear mechanism 51 and the front drive shafts 52, 53. The rear wheels 73, 74 are controlled by the rear-wheel drive force (target value) via the rear differential gear mechanism 61 and the rear drive shafts 64, 65. The actual all-wheel drive force is transmitted to the propeller shaft 55 via the transfer 54, and a portion of the actual all-wheel drive force transmitted to the propeller shaft 55 is distributed to the actual rear-wheel drive force transmitted to the rear differential gear mechanism 61. The remaining portion of the actual all-wheel drive force transmitted to the propeller shaft 55, transfer 54, and front differential gear mechanism 51 is the actual front-wheel drive force.

In the example of FIG. 1, the vehicle 1 is provided with transmission control means 40 (e.g., an automatic transmission (AT) ECU) for controlling the speed-change ratio (e.g., the speed-change gear ratio of the gear mechanism 32) of the transmission 30. The vehicle 1 is provided with a shift lever 33 and a shift position sensor 34, and the transmission control means 40 generally determines the speed-change gear ratio of the gear mechanism 32 on the basis of the shift position (e.g., "1," "2," "D") of the shift lever 33 as detected by the shift position sensor 34.

In the case that the shift position of the shift lever 33 is, e.g., "1," the transmission control means 40 controls the gear mechanism 32 so that the gear mechanism 32 has a speed-change gear ratio that represents the first speed. In the case that the shift position of the shift lever 33 is, e.g., "D," the transmission control means 40 determines the speed-change gear ratio that represents any one among all of the speed-change gears constituting the gear mechanism 32 composed of, e.g., first speed to fifth speed, on the basis of a control signal (e.g., the speed of the vehicle 1 and the all-wheel drive force (target value)) from the control device 100. In accordance therewith, the transmission control means 40 controls the gear mechanism 32 so that the gear mechanism 32 has a speed-change gear ratio that represents any one of, e.g., the first to fifth speeds. For example, when the transmission control means 40 thereafter changes from, e.g., the speed-change gear ratio that represents the first speed to the speed-change gear ratio that represents the second speed, the transmission control means 40 controls the gear mechanism 32 so that the gear mechanism 32 changes from the speed-change gear ratio that represents the first speed to the speed-change gear ratio that represents the second speed.

In the example of FIG. 1, the vehicle 1 is provided with a wheel speed sensor 81 for detecting the rotational speed of the front wheel 71, and is also provided with a wheel speed sensor 82 for detecting the rotational speed of the front wheel 72. The vehicle 1 is provided with a wheel speed sensor 83 for detecting the rotational speed of the rear wheel 73, and is also provided with a wheel speed sensor 84 for detecting the rotational speed of the rear wheel 74. The control device 100 can obtain the speed of the vehicle 1 on the basis of the rotational speed (wheel speed) detected by the wheel speed sensors 81, 82, 83, 84. The vehicle 1 is provided with a longitudinal acceleration sensor 85 (e.g., longitudinal G sensor for detecting acceleration in units of gravitational acceleration) for detecting the acceleration of the vehicle 1 along the front-rear or longitudinal direction of the vehicle 1, and the control device 100 can correct the speed of the vehicle 1 using the acceleration.

In the example of FIG. 1, the vehicle 1 is provided with a yaw rate sensor 86 for detecting the yaw rate when the vehicle 1 turns. The vehicle 1 is also provided with a lateral acceleration sensor 87 (lateral G sensor for detecting the centrifugal acceleration in units of gravitational acceleration) for detecting the centrifugal force (centrifugal acceleration) of the vehicle 1 along the lateral direction of the vehicle 1. The vehicle 1 is provided with a steering wheel 88 and a steering angle sensor 89, and the steering angle sensor 89 detects the steering angle of the steering wheel 88.

The control device 100 can detect side slipping and other behavior of the vehicle 1 on the basis of the yaw rate, centrifugal acceleration (lateral acceleration), and steering angle. In addition to detecting such behavior, the control device 100 can carry out various controls (e.g., control related to at least one among the front wheels 71, 72 and the rear wheels 73, 74 via the brakes or other braking unit (not shown)), and all of the controls described above are not required to be carried out. Described below is a general overview of control of the control device 100.

2. Control Device

Figure 2:
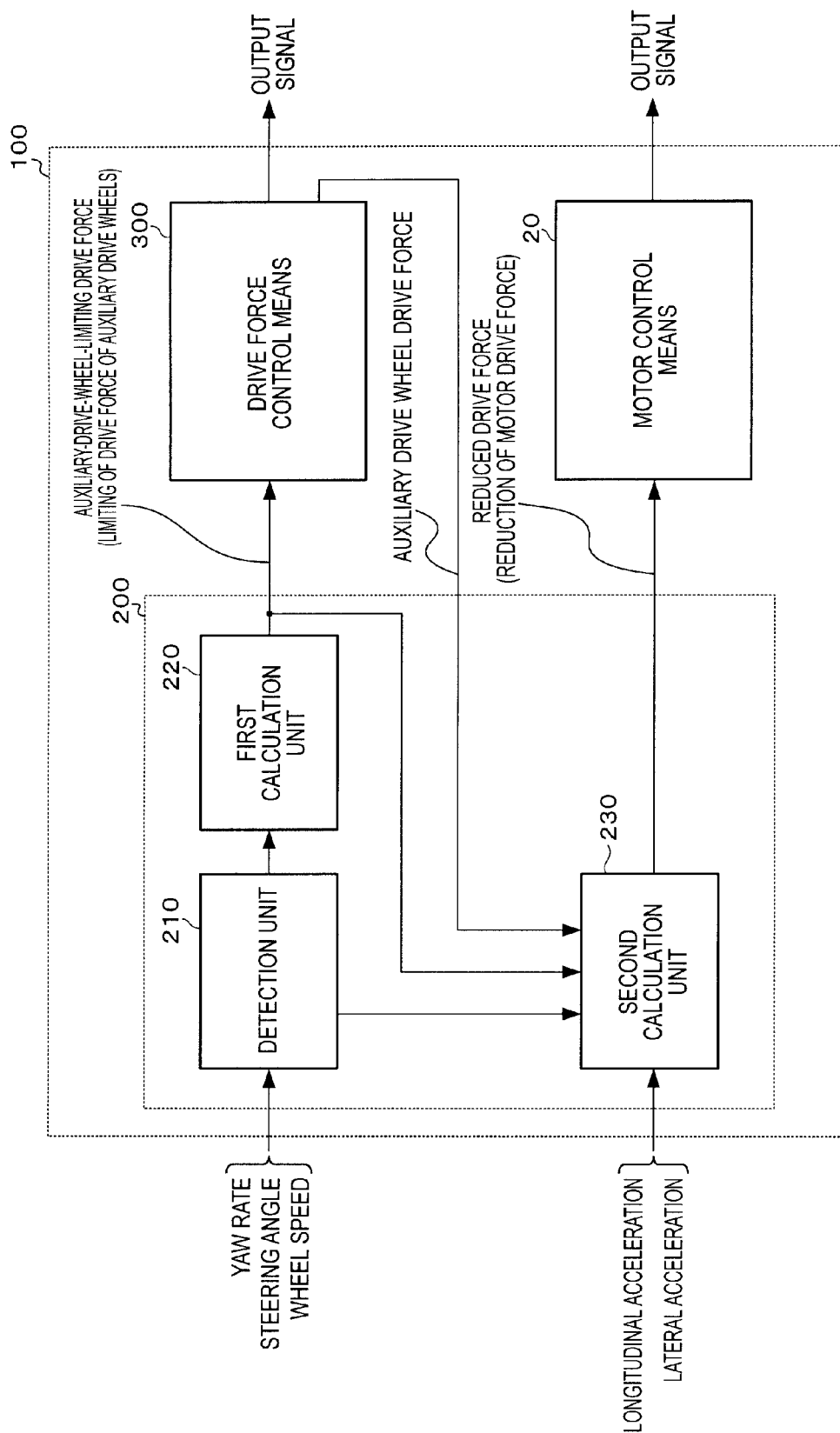
FIG. 2 is a block diagram showing a general configuration of the control device according to the present invention.

FIG. 2 shows in block diagram a general configuration of the control device according to the present invention. The control device 100 can receive, e.g., the yaw rate, the steer angle, the wheel speed, the longitudinal acceleration, and the lateral acceleration as input signals; can generate, e.g., two output signals; and can execute various controls, as shown in FIG. 2. The control device 100 is provided with drive force control means 300, and the drive force control means 300 controls the drive force of the main drive wheels (e.g., the front wheel drive force) and the drive force of the auxiliary drive wheels (e.g., rear wheel drive force), as an example of the various controls.

In the example of FIG. 2, the control device 100 is provided with vehicle behavior control means 200. The vehicle behavior control means 200 is capable of calculating as an example of various controls. Specifically, the vehicle behavior control means 200 calculates, e.g., the auxiliary-drive-wheels-limiting drive force for limiting the drive force of the auxiliary drive wheels. The vehicle behavior control means 200 can send the auxiliary-drive-wheels-limiting drive force to the drive force control means 300.

In the example of FIG. 1, the control device 100 is not provided with the motor control means 20, but in the example of FIG. 2, the control device 100 may be provided with the motor control means 20. The control device 100 (not shown) may be furthermore provided with, e.g., the transmission control means 40 of FIG. 1. In the example of FIG. 2, the motor control means 20 is capable of reducing the motor drive force on the basis of the auxiliary-drive-wheel-limiting drive force calculated by the vehicle behavior control means 200. In other words, the motor control means 20 can receive a reduction request or instruction from the vehicle behavior control means 200.

Specifically, the drive force control means 300 determines the ratio between the main drive wheel drive force (target value) and the auxiliary drive wheel drive force (target value), for example, and determines, e.g., the auxiliary drive wheel drive force (target value) on the basis of the ratio and the all-wheel drive force (target value). The drive force control means 300 controls, e.g., the distribution ratio of the rear differential gear mechanism 61 of FIG. 1 using output signals so that the determined auxiliary drive wheel drive force (target value) is obtained. The output signal from the drive force control means 300 to the rear differential gear mechanism 61 is a control signal for controlling the auxiliary drive wheel drive force (target value).

When the auxiliary drive wheel drive force is zero due to the distribution ratio of the rear differential gear mechanism 61, in other words, when the propeller shaft 55 and the rear drive shafts 64, 65 are cut off from each other, the main drive wheel drive force (target value) or the front-wheel drive force matches the all-wheel drive force (target value) in the example of FIG. 1. Alternatively, when the auxiliary drive wheel drive force is not zero due to the distribution ratio of the rear differential gear mechanism 61, in other words, when the propeller shaft 55 and the rear drive shafts 64, 65 are connected, the main drive wheel drive force (target value) matches the value obtained by subtracting the auxiliary drive wheel drive force (target value) from the all-wheel drive force (target value) in the example of FIG. 1.

In the example of FIG. 2, the control device 100 is provided with vehicle behavior control means 200. The vehicle behavior control means 200 is capable of accepting input signals that express yaw rate and the like acquired from the yaw rate sensor 86 of FIG. 1, for example. The vehicle behavior control means 200 is capable of calculating the auxiliary-drive-wheels-limiting drive force in accordance with detection of the unstable state of the vehicle 1, which is based on, e.g., the yaw rate or the like.

In the case that the vehicle behavior control means 200 makes a request or instruction for auxiliary-drive-wheels-limiting drive force (limiting drive force) to the drive force control means 300, the drive force control means 300 reduces the auxiliary drive wheel drive force (target value) and the drive force control means 300 increases the main drive wheel drive force (target value). At this time, the drive force control means 300 matches the auxiliary drive wheel drive force (target value) to the auxiliary-drive-wheels-limiting drive force (limiting drive force) to reduce the auxiliary drive wheel drive force (target value). Specifically, the drive force control means 300 controls the rear differential gear mechanism 61 so that the auxiliary drive wheel drive force is reduced by the distribution ratio of the rear differential gear mechanism 61. When the propeller shaft 55 and the rear drive shafts 64, 65 are more weakly connected, the actual auxiliary drive wheel drive force is reduced, and as a result, the actual main drive wheel drive force is increased. Reduced auxiliary drive wheel drive force makes it possible to, e.g., reduce oversteer. Therefore, the stability of the vehicle 1 is improved, for example.

The drive force control means 300 is capable of determining in advance the main drive wheel drive force (target value) and the auxiliary drive wheel drive force (target value), reducing the auxiliary drive wheel drive force (target value) determined in advance in accordance with the a request from the vehicle behavior control means 200, and increasing the main drive wheel drive force (target value) determined in advance.

The vehicle behavior control means 200 is capable of calculating the reduced drive force that expresses the amount by which the motor drive force is reduced on the basis of the auxiliary-drive-wheel-limiting drive force. The motor control means 20 reduces the motor drive force in the case that the vehicle behavior control means 200 sends a reduced drive force to the motor control means 20. At this time, the motor control means 20 reduces the motor drive force by amount equal to the reduced drive force. In other words, the drive force control means 20 can calculate a value obtained by subtracting the reduced drive force from the primarily determined motor drive force as the secondarily (ultimately) determined motor drive force. The motor control means 20 is capable of outputting an output signal that is based on the motor drive force. The output signal from the motor control means 20 to the motor 10 is a control signal that corresponds to, e.g., the throttle position in the motor 10 of FIG. 1. The output signal from the motor control means 20 to the motor 10, e.g., an internal combustion engine, may be a control signal corresponding to a fuel injection amount determined by a fuel injection device (not shown) inside the internal combustion engine. The drive force control means 300 may also be referred to as first control means for determining the main drive wheel drive force (target value) and the auxiliary drive wheel drive force (target value), and the vehicle behavior control means 200 may be referred to as second control means. The drive force control means 300 (first control means) primarily determines the main drive wheel drive force (target value) and the auxiliary drive wheel drive force (target value). The drive force control means 300 (first control means) may determine whether to respond to the request for limiting the auxiliary drive wheel drive force (target value) from the vehicle behavior control means 200 (second control means), and may reject the request for limitation. In the case that the vehicle behavior control means 200 sends to the drive force control means 300 the auxiliary-drive-wheels-limiting drive force (limiting drive force), the drive force control means 300 (first control means) can secondarily (ultimately) determine the main drive wheel drive force (target value) and the auxiliary drive wheel drive force (target value).

The motor control means 20 may be referred to as third control means for determining the motor drive force. The motor control means 20 is, e.g., an engine ECU, fuel injection (FI)-ECU, or the like.

3. Vehicle Behavior Control Means (Second Control Means)

FIG. 2 also shows a schematic structural diagram of the vehicle behavior control means 200 according to the present invention. The vehicle behavior control means 200 (second control means) is capable of requesting or instructing the drive force control means 300 (first control means) to reduce the auxiliary drive wheel drive force (target value). In the example of FIG. 2, the vehicle behavior control means 200 is provided with a detection unit 210, a first calculation unit 220, and a second calculation unit 230. The first calculation unit 220 is capable of calculating the auxiliary-drive-wheel-limiting drive force for limiting the auxiliary drive wheel drive force.

3.1. Detection Unit

The detection unit 210 detects, e.g., the unstable state of the vehicle 1 and can instruct the first calculation unit 220 so that the first calculation unit 220 outputs the auxiliary-drive-wheels-limiting drive force. In the case that an unstable state has been detected, the detection unit 210 can send to the first calculation unit 220 a signal (e.g., a signal expressing a binary "1" or high level) expressing instruction or permission to output the auxiliary-drive-wheel-limiting drive force. For example, the actual yaw rate obtained from the yaw rate sensor 86 and the scale yaw rate calculated based on the speed of the vehicle 1 and the steering angle are used to determine whether or not the vehicle 1 is traveling in a stable state. Specifically, an unstable state can be defined as when the difference between the actual yaw rate and the scale yaw rate (yaw rate deviation) is greater than a predetermined value. Also, an unstable state may be determined by subjecting the yaw rate deviation to filter processing. It is also possible to correct or adjust the scale yaw rate using the lateral acceleration acquired from the lateral acceleration sensor 87.

The detection unit 210 can accept input of the steer angle from, e.g., the steering angle sensor 89. Also, the detection unit 210 is capable of calculating the average of four rotational speeds (wheel speeds) detected by, e.g., the wheel speed sensors 81, 82, 83, 84 and obtain the average wheel speed Vaw_av of the drive wheels as the speed of the vehicle 1. Alternatively, the detection unit 210 calculates the average of two rotational speeds (wheel speeds) detected by, e.g., the wheel speed sensors 83, 84, and obtain or estimate the speed Vvh_es of the vehicle 1 as the speed of the vehicle 1.

The speed Vvh_es (estimated speed) of the vehicle 1 may include the application of an increasing limit and a decreasing limit to each of the wheel speeds of the rear wheels 73, 74 (auxiliary drive wheels) in order to eliminate the effect of noise caused by vibrations and the like of the vehicle 1, for example. In other words, the first calculation unit 220 is capable of correcting or adjusting the two rotational speeds (wheel speeds) detected by the wheel speed sensors 83, 84, calculating the average of the two rotational speeds (wheel speeds) thus corrected or adjusted, and obtaining or estimating the speed Vvh_es of the vehicle 1. The speed Vvh_es (estimated speed) of the vehicle 1 may be estimated using another method.

The detection unit 210 is capable of sending to the first calculation unit 220 a signal that expresses whether the traveling state of the vehicle 1 is unstable, and is furthermore capable of sending to the first calculation unit 220 a signal that expresses, e.g., the yaw rate deviation of the vehicle 1. In the case that the vehicle 1 is traveling in an unstable state, the first calculation unit 220 is capable outputting the auxiliary-drive-wheel-limiting drive force to the drive force control means 300.

3.2. First Calculation Unit

The first calculation unit 220 of FIG. 2 calculates an auxiliary-drive-wheel-limiting drive force on the basis of detection of an unstable state of the vehicle 1. In the case that the vehicle 1 is traveling in an unstable state, the first calculation unit 220 or the vehicle behavior control means 200 is capable sending to the drive force control means 300 an auxiliary-drive-wheel-limiting drive force for limiting the auxiliary drive wheel drive force.

FIGS. 3(A) and 3(B) represent output examples of the calculation unit. The solid line in the example of FIG. 3(A) represents the auxiliary-drive-wheel-limiting drive force calculated by the first calculation unit 220, and the dotted line shows the auxiliary drive wheel drive force determined by the drive force control means 300. The first calculation unit 220 or the vehicle behavior control means 200 does not send a limit of the auxiliary drive wheel drive force to the drive force control means 300 until time T1. In other words, the output from the first calculation unit 220 is a value (single-dot-dash line) that does not limit the auxiliary drive wheel drive force. The value that does not limit the auxiliary drive wheel drive force is, e.g., a maximum value of the auxiliary drive wheel drive force that can be determined by the drive force control means 300. At time T1, the first calculation unit 220 requests from (outputs to) the drive force control means 300 a limit (a value for limiting the auxiliary drive wheel drive force; the auxiliary-drive-wheel-limiting drive force) of the auxiliary drive wheel drive force. In the example of FIG. 3(A), the drive force control means 300 accepts a request from the first calculation unit 220 at time T1 and causes the auxiliary drive wheel drive force to match the auxiliary-drive-wheel-limiting drive force. In other words, the drive force control means 300 can cause the primarily determined auxiliary drive wheel drive force to match the auxiliary-drive-wheel-limiting drive force, and can use the auxiliary-drive-wheel-limiting drive force as the secondarily (ultimately) determined auxiliary drive wheel drive force.

The amount of reduction in output from the drive force control means 300 at time T1 is a value obtained by subtracting the auxiliary-drive-wheel-limiting drive force from the primarily determined auxiliary drive wheel drive force. The drive force control means 300 receives a request from the first calculation unit 220 at time T1 and causes the auxiliary drive wheel drive force to match the auxiliary-drive-wheel-limiting drive force, and the main wheel drive wheel drive force therefore increases by an amount commensurate with the decrease in auxiliary drive wheel drive force. Oversteer or other instability can thereby be suppressed or eliminated.

The first calculation unit 220 is capable of calculating the auxiliary-drive-wheel-limiting drive force from time T1 to time T2 so that, e.g., the yaw rate deviation is reduced so as to stabilize the traveling state of the vehicle 1. The traveling state of the vehicle 1 is not unstable at time T2, and the first calculation unit 220 or the vehicle behavior control means 200 does not send a limit of the auxiliary drive wheel drive force to the drive force control means 300 at time T2 and thereafter. In the example of FIG. 3(A), in a case in which the yaw rate deviation has decreased at, e.g., time TA prior to time T2 and the state in which the vehicle 1 is traveling is substantially stable, the drive force control means 300 accepts requests from the first calculation unit 220 from time T1 to time TA and causes the auxiliary drive wheel drive force to match the auxiliary-drive-wheel-limiting drive force as indicated by the solid bold line in FIG. 3(A). In the example of FIG. 3(A), the drive force control means 300 accepts requests from the first calculation unit 220 from time T1 to time TA and causes the auxiliary drive wheel drive force to match the auxiliary-drive-wheel-limiting drive force as indicated by the solid bold line in FIG. 3(A), in cases in which the yaw rate deviation is smaller at, e.g., time TA prior to time T2 and the traveling state of the vehicle 1 is essentially stabilized.

In the example of 3(B), at time T1, the first calculation unit 220 calculates the auxiliary-drive-wheel-limiting drive force on the basis of the detection of the unstable state of the vehicle 1, and from time T1 to time T2, the first calculation unit 220 continues to output the auxiliary-drive-wheel-limiting drive force, which is a fixed value that does not depend on change in the yaw rate deviation after time T1. In the example of FIG. 3(B), the drive force control means 300 accepts requests from the first calculation unit 220 from time T1 to time T2 and causes the auxiliary drive wheel drive force to match the auxiliary-drive-wheel-limiting drive force, which is drawn with a solid bold line.

In the examples of FIGS. 3(A) and 3(B), slipping of the main drive wheel drives (e.g., the front wheels 71, 72) may occur due to an increase in the main drive wheel drive force in the interval of time T1 to time TA or time T2. The vehicle behavior control means 200 of FIG. 2 may execute the function (traction control system) for suppressing spinning of the front wheels 71, 72 and the rear wheels 73, 74. The vehicle behavior control means 200 or a second calculation unit 230 (described later) can control spinning via a request or the like to reduce the motor drive force on the basis of amount of slippage of the main drive wheels (front wheels 71, 72). The vehicle behavior control means 200 or the second calculation unit 230 may suppress spinning via the brakes (not shown) or other braking unit. The slip amount Smw of the main drive wheels is a value obtained by, e.g., subtracting the estimated speed Vvh_es of the vehicle 1 from the average wheel speed Vmw_av of the main drive wheels. In the case that the main drive wheels (front wheels 71, 72) slip in the interval from time T1 to time T2, the vehicle behavior control means 200 may request a limit of the auxiliary drive wheel drive force and may also request, e.g., a reduction in the motor drive force from the motor control means 20.

3.3. Second Calculation Unit

The second calculation unit 230 of FIG. 2 is capable of calculating the reduced drive force that expresses the amount by which the motor drive force is reduced on the basis of the auxiliary-drive-wheel-limiting drive force. Specifically, the second calculation unit 230 can calculate the reduced drive force of when the vehicle 1 has been detected to be traveling in an unstable state by the detection unit 210, the reduced drive force being the difference between the auxiliary drive wheel drive force (e.g., the auxiliary drive wheel drive force immediately prior to time T1 in FIG. 3(B)) from, e.g., the drive force control means 300 and the auxiliary-drive-wheel-limiting drive force (e.g., the auxiliary-drive-wheel-limiting drive force immediately after time T1 in FIG. 3(B)) from the first calculation unit 220. In the example of FIG. 3(B), the motor drive force may be reduced even after the main drive wheels (front wheels 71, 72) have slipped in the interval from time T1 to time T2; however, the second calculation unit 230 may send a reduced drive force to the motor control means 20 at time T1. Slipping of the main drive wheels (front wheels 71, 72) can thereby be suppressed at an early stage at time T1.

The second calculation unit 230 is capable of calculating the reduced drive force at time T1 by multiplying a coefficient and, e.g., a value obtained by subtracting the auxiliary-drive-wheel-limiting drive force at time T1 from the auxiliary drive wheel drive force at time T1. The coefficient is a coefficient (down coefficient) in the range of, e.g., "0" to "1." The down coefficient can be set lower in correspondence to a higher level of at least one of the longitudinal acceleration or the lateral acceleration. The reduced drive force at time T1 is lower in corresponding fashion with the lower down coefficient. The down coefficient may be suitably set in accordance with the attributes (e.g., weight, engine displacement) of the vehicle 1.

Figure 4:
FIGS. 4(A) and 4(B) are graphs each showing a control maps used for setting a down coefficient.
Figure 4:
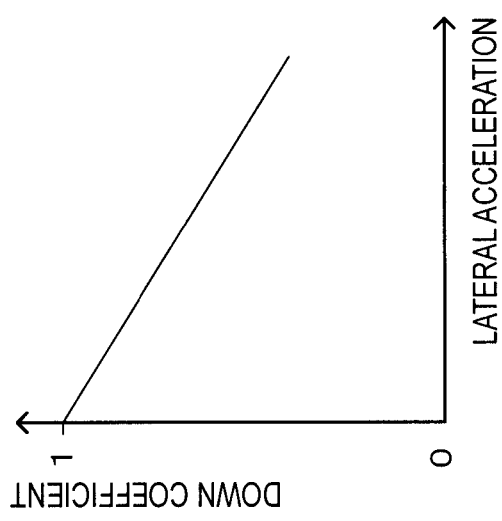

FIGS. 4(A) and 4(B) represent examples of setting the down coefficient. In the example of FIG. 4(A), the down coefficient is higher in correspondence with a higher longitudinal acceleration; however, the relationship between the down coefficient and the longitudinal acceleration is not limited to the example of FIG. 4(A). For example, the relationship between the down coefficient and the longitudinal acceleration may also be a line chart. The relationship between the down coefficient and the longitudinal acceleration may be a curve expressed by a quadratic function, a higher-degree polynomial function, or the like rather than a linear function; and may be a stepped linear relationship expressed by a step function. In the example of FIG. 4(B), the down coefficient is higher in correspondence with a higher lateral acceleration; however, the relationship between the down coefficient and the lateral acceleration is not limited to the example of FIG. 4(B). For example, the relationship between the down coefficient and the lateral acceleration may also be a line chart. The relationship between the down coefficient and the lateral acceleration may be a curve expressed by a quadratic function, a higher-degree polynomial function, or the like rather than a linear function; and may be a stepped linear relationship expressed by a step function.

In the case that the second calculation unit 230 obtains the down coefficient on the basis of both the longitudinal acceleration and the lateral acceleration at time T1, the down coefficient is the smallest among the down coefficient (first down coefficient) based on, e.g., the longitudinal acceleration and down coefficient (second down coefficient) based on the lateral acceleration. In the case that the longitudinal acceleration or the lateral acceleration of the vehicle is high, the down coefficient, and consequently the reduced drive force, can be set to a low level with consideration given to the stability of the vehicle 1. The second calculation unit 230 can thus calculate the reduced drive force at, e.g., time T1 when the traveling state of the vehicle 1 is unstable.

4. Motor Control Means (Third Control Means)

Figure 5:
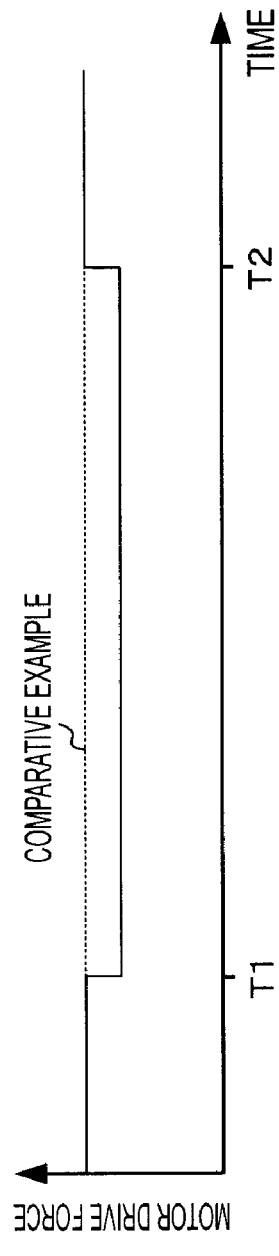
FIGS. 5(A) and 5(B) timing charts illustrative of operations of the control device according to the present invention.
Figure 5:
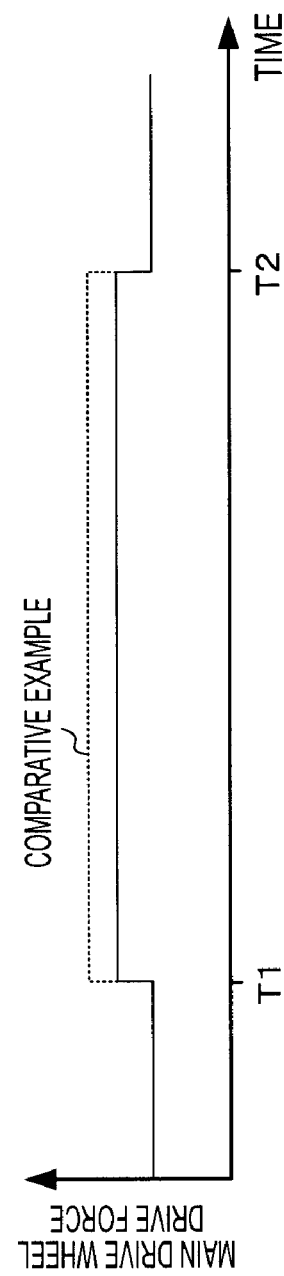

FIGS. 5(A) and 5(B) represent examples of the operation of the control device according to the present invention, and FIGS. 5(A) and 5(B) correspond to a reduction in auxiliary drive wheel drive force from time T1 to time T2 of FIG. 3(B). In the example of FIG. 3(B), the first calculation unit 220 of FIG. 2 outputs the auxiliary-drive-wheel-limiting drive force to the drive force control means 300 at time T1. At this time, the second calculation unit 230 outputs the reduced drive force to the motor control means 20. In the example of FIG. 5(A), the motor control means 20 accepts a request from the second calculation unit 230 at time T1 and causes the motor drive force to be reduced by an amount equal to the reduced drive force. In FIG. 5(A), the solid line represents the change in the motor drive force, and the motor drive force decreases from time T1 to time T2. This means that the drive force of all the wheels (main wheel drive force and auxiliary drive wheel drive force) decreases from time T1 to time T2. The dotted line represents a comparative example, and in the case that the motor control means 20 does not receive a request from the first calculation unit 220, the motor drive force is constantly fixed, which means that the drive force of all the wheels is also constantly fixed from time T1 to time T2.

In FIG. 5(B), the solid line represents the change in the main drive wheel drive force, and the main drive wheel drive force increases from time T1 to time T2. Since the main drive wheel drive force is a value obtained by subtracting the auxiliary drive wheel drive force (auxiliary-drive-wheel-limiting drive force) from the drive force of all the wheels, the amount of increase in the main drive wheel drive force from time T1 to time T2 is a value obtained by subtracting the reduced amount of drive force of all the wheels from the reduced amount of auxiliary drive wheel drive force. In FIG. 5(B), the dotted line represents a comparative example. In the comparative example, the amount of increase (dotted line) of the main drive wheel drive force from time T1 to time T2 is greater than the amount of increase (solid line) of the main drive wheel drive force because the motor drive force is constantly fixed and the amount of reduction of the drive force of all the wheels is zero. This means that in the comparative example the main drive wheels may already be capable of slipping at time T1. In other words, in the operation example of the control device 100, slipping of the main drive wheels can be suppressed at an early stage at time T1 in accordance with the reduction in the motor drive force carried out by the motor control means 20.

Obviously, various minor changes and modifications of the present invention are possible in light of the above teaching. It is therefore to be understood that within the scope of the appended claims the invention may be practiced otherwise than as specifically described.

What is claimed is:

1. A control device for controlling a front-wheel drive force and a rear-wheel drive force of a vehicle, the control device comprising:
    first control means for controlling a drive force of a main drive wheel and a drive force of an auxiliary drive wheel, the drive force of the main drive wheel being one of the front-wheel drive force and the rear-wheel drive force, and the drive force of the auxiliary drive wheel being another of the front-wheel drive force and the rear-wheel drive force;
    second control means for sending to the first control means an auxiliary-drive-wheel-limiting drive force for limiting the drive force of the auxiliary drive wheel in the case that the vehicle is traveling in an unstable state, and
    third control means for controlling a motor drive force, which is a source of the drive force of the main drive wheel and the drive force of the auxiliary drive wheel, wherein in the case that the vehicle is traveling in an unstable state, the first control means reduces the drive force of the auxiliary drive wheel and the third control means reduces the motor drive force on the basis of the auxiliary-drive-wheel-limiting drive force.

2. The control device according to claim 1, wherein the first control means increases the drive force of the main drive wheel by causing the drive force of the auxiliary drive wheel to match the auxiliary-drive-wheel-limiting drive force.

3. The control device according to claim 1, wherein the second control unit further has a detection unit for detecting whether the traveling state is unstable.

4. The control device according to claim 1, wherein the second control means has:
    a first calculation unit for calculating the auxiliary-drive-wheel-limiting drive force; and
    a second calculation unit for calculating a reduced drive force that represents an amount of reduction of the motor drive force on the basis of the auxiliary-drive-wheel-limiting drive force.

5. The control device according to claim 4, wherein the reduced drive force decreases in correspondence with an increase in at least one of longitudinal acceleration and lateral acceleration of the vehicle.

6. The control device according to claim 4, wherein the second control means sends the reduced drive force to the third control means; and
    the third control means reduces the motor drive force by an amount equal to the reduced drive force.

7. The control device according to claim 1, wherein the drive force of the main drive wheel is the front-wheel drive force, and
    the drive force of the auxiliary drive wheel is the rear-wheel drive force.

8. The control device according to claim 1, wherein the first control means is drive force control means, the second control means is vehicle behavior control means, and the third control means is motor control means.

9. A control device for controlling a front-wheel drive force and a rear-wheel drive force of a vehicle, the control device comprising:
    first control means for controlling a drive force of a main drive wheel and a drive force of an auxiliary drive wheel, the drive force of the main drive wheel being one of the front-wheel drive force and the rear-wheel drive force, and the drive force of the auxiliary drive wheel being another of the front-wheel drive force and the rear-wheel drive force;
    second control means for sending to the first control means an auxiliary-drive-wheel-limiting drive force for limiting the drive force of the auxiliary drive wheel in the case that the vehicle is traveling in an unstable state, and
    third control means for controlling a motor drive force, which is a source of the drive force of the main drive wheel and the drive force of the auxiliary drive wheel, wherein
    the third control means reduces the motor drive force on the basis of the auxiliary-drive-wheel-limiting drive force, wherein
    the second control means has:
        a first calculation unit for calculating the auxiliary-drive-wheel-limiting drive force; and
        a second calculation unit for calculating a reduced drive force that represents an amount of reduction of the motor drive force on the basis of the auxiliary-drive-wheel-limiting drive force,
    and wherein
    the second calculation unit calculates, as the reduced drive force, a value obtained by multiplying a coefficient and a difference between the drive force of the auxiliary drive wheel and the auxiliary-drive-wheel-limiting drive force; and
    the coefficient decreases in correspondence with an increase in at least one of longitudinal acceleration and lateral acceleration of the vehicle.

* * * * *